United States Patent
Mukaiyama et al.

[11] Patent Number: 6,086,660
[45] Date of Patent: Jul. 11, 2000

[54] AQUEOUS INK COMPOSITION, PROCESS FOR PREPARING THE SAME, AND INK JET RECORDING USING THE SAME

[75] Inventors: Keiichi Mukaiyama; Hiroshi Mukai, both of Nagano, Japan

[73] Assignee: Seiko Epson Corporation, Japan

[21] Appl. No.: 09/241,128

[22] Filed: Feb. 1, 1999

[30] Foreign Application Priority Data

Feb. 2, 1998 [JP] Japan .................................. 10-020549

[51] Int. Cl.[7] .................................................. C09D 11/02
[52] U.S. Cl. ...................................... 106/31.43; 106/31.32; 106/31.48; 106/31.5; 106/31.51; 106/31.52
[58] Field of Search ............................ 106/31.32, 31.43, 106/31.48, 31.5, 31.51, 31.52

[56] References Cited

U.S. PATENT DOCUMENTS

| | | | |
|---|---|---|---|
| 5,092,926 | 3/1992 | Owatari | 106/31.32 |
| 5,637,138 | 6/1997 | Yamazaki | 106/31.32 |
| 5,645,630 | 7/1997 | Yamazaki | 106/31.32 |
| 5,755,861 | 5/1998 | Fujioka et al. | 106/31.32 |
| 5,824,142 | 10/1998 | Yamazaki | 106/31.32 |

FOREIGN PATENT DOCUMENTS

| | | | |
|---|---|---|---|
| 0 612 820 A2 | 8/1994 | European Pat. Off. | C09D 11/00 |
| 0 790 127 A2 | 8/1997 | European Pat. Off. | B41J 2/16 |
| 05-017714 | 1/1993 | Japan . | |
| 9-123437 | 5/1997 | Japan . | |
| 2 055 116 | 2/1981 | United Kingdom | C09D 11/02 |

OTHER PUBLICATIONS

Copy of European Search Report for EP Application No. 99 10 2096 dated May, 17, 1999.

*Primary Examiner*—Helene Klemanski
*Attorney, Agent, or Firm*—Fish & Richardson P.C.

[57] ABSTRACT

An aqueous ink composition containing urea, an azo dye colorant, and water, with dissolved ammonium ion and nitrogen contents lower than 200 ppm and 5 ppm, respectively. The composition is highly stable to elevated temperatures and extended storage times, and gives excellent printing quality. Methods for making the inventive ink compositions, and methods of using the compositions in ink jet recording are also disclosed.

10 Claims, 2 Drawing Sheets

AQUEOUS INK COMPOSITION, PROCESS FOR PREPARING THE SAME, AND INK JET RECORDING USING THE SAME

BACKGROUND OF THE INVENTION

1. Field of the Invention

The invention relates to aqueous ink compositions which are stably ejected in a jet for an extended period of time, a process for preparing the same, and an ink jet recording method using the same. More particularly, it relates to an aqueous ink composition which is stable in ejecting through ink jet nozzles in an ink jet recording and to a process for preparing ink having improved ejecting properties.

2. Related Art

An ink jet recording unit is mounted on a computer terminal, a printing calculator, a facsimile, or similar device. The printing performance of the ink jet recording unit is largely governed by the nature and quality of the ink. For example, if an ink component coagulates as a result of water evaporation from the ink, or if a material forming the ink path through the ink jet head dissolves and precipitates in ink, the ink jet nozzles can become clogged and fail to eject ink droplets.

JP-A-9-123437 teaches adding urea to ink compositions to improve water retention. According to the technique disclosed, evaporation of the water content is suppressed to prevent the ink component from coagulation. Also, the solubility of the material constituting the ink path through the ink jet head is increased to prevent the material from precipitating. Although addition of urea to ink compositions is effective in preventing clogging of the ink eject, it has been learned that urea can decompose to detrimentally alter the ink composition or its physical properties. This can result in deteriorated printing quality when a urea-containing ink composition is left to stand at high temperatures or for extended periods at moderate temperatures. It has hence been proposed to add not only urea but ammonium ions to ink compositions thereby suppressing urea decomposition as disclosed in JP-A-5-17714.

However, where urea is added to an ink composition containing an azo dye as a colorant, reduction in printing performance can result for another reason. That is, there is a tendency for the ink composition to be supersaturated with nitrogen in the ink passageway. Thus, the composition is prone to forming bubbles when subjected to shocks, such as a pressure shock attendant upon ejecting. In such cases, the energy for ejecting ink is partially absorbed by the gas bubbles, resulting in a failure to eject ink stably.

In one aspect, the present invention provides aqueous ink compositions containing an azo dye and urea which maintains high printing performance while preventing bubble formation in the course of use.

In another aspect, the invention provides a process for preparing such aqueous ink compositions.

In a further aspect, the invention provides an ink jet recording method using such aqueous ink compositions.

In some preferred embodiments, the invention provides an aqueous ink composition comprising urea, a colorant comprising an azo dye, and water. Such a preferred composition has a dissolved ammonium ion concentration of not more than 200 ppm, and a dissolved nitrogen content of not more than 5 ppm.

The term "urea" as used herein includes not only urea itself, but analogous compounds such as thiourea. The term "aqueous ink" as used herein denotes not only inks containing water as the sole solvent, but also those containing mixed solvents such as water and a water-soluble organic solvent. The language "comprising urea, a colorant comprising an azo dye, and water" implies that the ink can contain other components, such as viscosity modifies and rust inhibitors, if desired.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable materials and methods are described below. All publications, patent applications, patents and other references mentioned herein are incorporated by reference in their entirety. In case of conflict, the present specification, including definitions, will control. In addition, the materials, methods and examples are illustrative only and not intended to be limiting.

Other features and advantages of the invention will be apparent from the following detailed description, and from the claims.

DETAILED DESCRIPTION OF PREFERRED EMBODIMENTS

Figure 1:
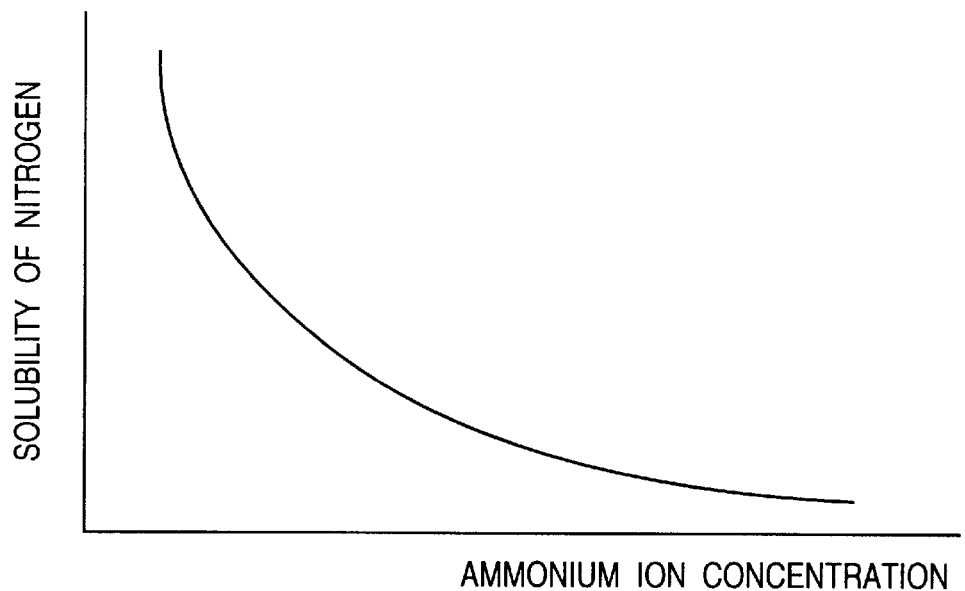
FIG. 1 is a graph showing the relationship between ammonium ion concentration and solubility of nitrogen in ink compositions.

When an aqueous ink composition containing a colorant comprising an azo dye and urea is allowed to stand at high temperature, or for long periods at more moderate temperature, the azo dye can decompose to form molecular nitrogen ($N_2$), and the urea can decompose to form ammonium ions ($NH_4^+$). At an ink composition pH of 7 or higher, the ammonium ions can produce free ammonia ($NH_3$). As seen in the relationship between ammonium ion concentration and solubility of nitrogen depicted in FIG. 1, as ammonium ion concentration increases, the amount of nitrogen that can dissolve in ink decreases. Accordingly, addition of urea to an ink composition containing an azo dye, while effective in preventing nozzles from being clogged, tends to bring about supersaturation with nitrogen, and shocks of ejecting can easily form bubbles. As a result, the energy input for ejecting the ink is partially absorbed by the gas bubbles, and the ink fails to eject in a stable manner. This problem is eliminated in the present invention by controlling both the initial dissolved nitrogen content and the initial ammonium ion concentration. There is thus provided aqueous ink which retains high printing performance, in which dissolved nitrogen does not tend to reach supersaturation, and bubbles do not readily form.

The ammonium ion concentration can be reduced by blowing nitrogen through the prepared ink as described below. Alternately or additionally, the ammonium ion concentration can be controlled by adjusting the amount of urea added, thereby substantially preventing bubble formation. For example, when the amount of added urea is limited within a range of from about 0.2 to about 2.4% by weight, it is possible to maintain the initial ammonium ion concentration to 200 ppm or below without conducting the step of blowing nitrogen. With the ammonium ion concentration kept lowered in this way, the solubility of nitrogen can be maintained at a high level. Bubble formation in ink is thus avoided for a prolonged period of time merely by degassing prepared ink to adjust the initial dissolved nitrogen content to 5 ppm or below. While the amount of added urea should be minimized to prevent bubble formation, it is desirable to add urea in an amount of at least about 0.2% by weight to prevent jet nozzle clogging.

The aqueous ink according to the present invention can be prepared by a process comprising the steps of: a) blowing nitrogen through an ink composition comprising urea, a colorant comprising an azo dye, and water, thereby releasing free ammonia from the composition and concurrently reducing the dissolved ammonium ion concentration, b) degassing the resulting composition to release nitrogen, and c) filling an ink container with the resulting composition.

In summary, a reduction in ammonium ion concentration is achieved in the course of ink composition preparation by using nitrogen, which can be removed later by an easy operation such as degassing with another gas, such as argon for example, or by exposing the composition to reduced pressure. Thus, at the conclusion of the ink composition preparation, an aqueous ink composition having a low dissolved ammonium ion concentration and a low dissolved nitrogen content is obtained. Since both the ammonium ion concentration and dissolved nitrogen content are fairly low in the initial stage, nitrogen does not tend to reach supersaturation in spite of the presence of urea, and bubbles do not tend to form in the ink while in use. Thus, the aqueous ink composition according to the present invention retains high printing performance.

The step of blowing nitrogen is preferably carried out until the dissolved ammonium ion concentration in the prepared ink composition decreases to 200 ppm or lower. The step of degassing is preferably carried out until the dissolved nitrogen content in the prepared ink decreases to 5 ppm or lower. With the ammonium ion concentration and dissolved nitrogen content so controlled, there is no observed reduction in printing performance due to bubble formation during the typical service life of the ink composition.

It is preferred that the pH of the prepared ink be adjusted to a value of from about 7 to about 10 so that borosilicate glass, which can constitute part of the ink flow path of the ink jet head does not dissolve. In this pH range, ammonium ion is converted to free ammonia, and the amount of nitrogen that can dissolve in the ink decreases, tending to lead to nitrogen supersaturation. However, the ink according to the present invention is free from nitrogen supersaturation during use because the initial ammonium ion and nitrogen concentrations have been reduced to low levels, as desribed above.

Because the aqueous ink compositions of the invention do not suffer from bubble formation upon being subjected to pressure shocks resulting from a ejecting operation, they are well suited to ink jet recording in which the ink composition is ejected in a jet from ink jet nozzles onto a recording medium. Even where part of the ink path of the ink jet nozzles is made of borosilicate glass, the urea present in the inventive ink composition prevents the glass components from being coated with precipitants and causing clogging of the nozzles.

Figure 2:
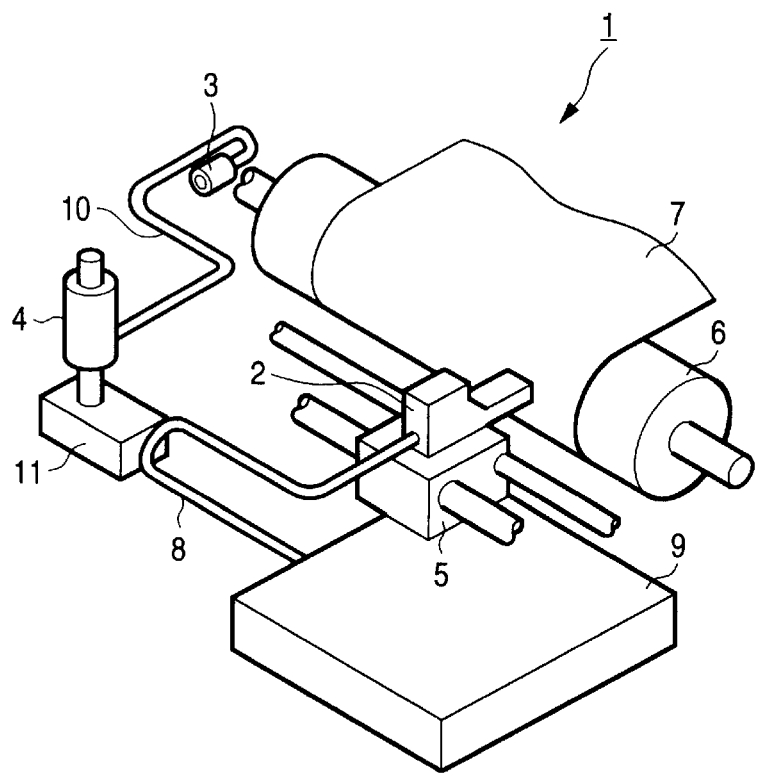
FIG. 2 is a schematic view of an ink jet recording unit.

FIG. 2 is a schematic illustration of an ink jet recording unit. Ink jet recording unit 1 has ink jet head 2 mounted on carriage 5. Carriage 5 reciprocates to carry out the printing of letters and images on recording paper 7 held on platen 6. Ink tank (or ink container) 9 containing a printing ink composition is connected to ink jet head 2 via ink feed tube 8. Ink jet recording unit 1 has cap 3 that is capable of covering the nozzles of head 2, and pump 4 is connected to cap 3 through discharge tube 10. On operating pump 4 with the nozzles of head 2 covered with cap 3, bubbles and ink are drawn to cap 3 from the nozzles of head 2, and the drawn ink is held in an ink absorber (not shown) in cap 3 and then discharged into spent ink reservoir 11.

While the ink jet recording unit shown in FIG. 2 has been described with respect to use of the ink composition of the invention in an off-carriage type in which ink jet head 2 and ink tank 9 are separate members that are connected with a tube, the ink composition of the invention is applicable as well to an ink jet recording unit of on-carriage type in which an ink jet head and an ink tank are integrally molded and mounted on a carriage. Since the ink of the invention is prevented from undergoing a viscosity increase and forming bubbles, the cap for covering the ink jet head as used in the ink jet recording unit of FIG. 2 can be omitted depending on the mode or condition of use of a recording unit.

Figure 3:
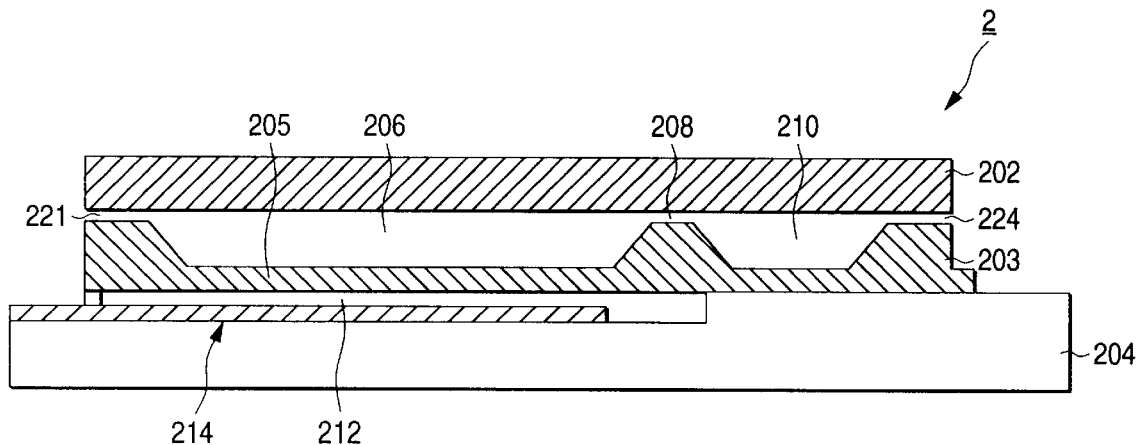
FIG. 3 is a partial cross section of an ink jet head.

FIG. 3 is a partial cross section of ink jet head 2 of the edge ink jet type. In the edge ink jet head, an ink droplet is ejected from ink nozzles provided at the edge of a base by an electrostatic drive. Ink jet head 2 comprises cover plate 202 made of glass, cavity plate 203 made of a p-type silicon plate, and glass substrate 204. These plates are bonded together in this order as shown. A plurality of runners is formed at the edge of cavity plate 203 to form an equal number of nozzles 221. Cavity plate 203 is shaped to have recesses. Each recess provides pressure chamber 206, the bottom of which functions as vibrating plate 205. Fine runners 208 are present at the rear of each recess and a recess forming ink reservoir 210 serves to feed ink to individual pressure chambers 206. Ink reservoir 210 has ink feed hole 224 connecting to ink feed tube 8 (FIG. 2), and ink is fed thereto from ink tank 9 (FIG. 2). The fed ink composition is initially reserved in ink reservoir 210. The lower side of cavity plate 203 has a mirror finish and attached to glass substrate 204. Glass substrate 204 has recesses, each of which functions as vibration chamber 212 at positions corresponding to individual vibrating plates 205. Each recess of glass substrate 204 has an electrode 214 which faces its respective vibrating plate 205. Recording signals are sent from the drive to electrode 214, vibrating plate 205 vibrates by electrostatic force, and the vibration energy varies the inner pressure of pressure chamber 206, thereby ejecting an ink droplet from nozzle 221.

If the ink composition is supersaturated with nitrogen in ink jet head 2, bubbles are generated by shocks, such as a pressure shock from ejecting. Bubbles formed absorb the ink ejecting energy, resulting in a failure to stably eject the ink composition. Use of the ink compositions according to the present invention has been described with particular reference to the electrostatic drive ink jet recording system shown in FIGS. 2 and 3, in which the capacity of the pressure chamber containing ink is changed by electrostatic force to eject ink droplets. The problems discussed above, such as bubble formation, also arise with other electromechanical drive ink jet recording systems, such as a system in which ink is boiled by a heater and ink droplets are ejected by the pressure of bubbles formed thereby and a system in which a voltage is applied to a piezoelectric element attached to the pressure chamber containing ink to expand and contract the pressure chamber thereby to eject ink droplets. The ink of the invention is applicable to any of these systems to produce similar effects on bubble formation and the like.

Figure 4:
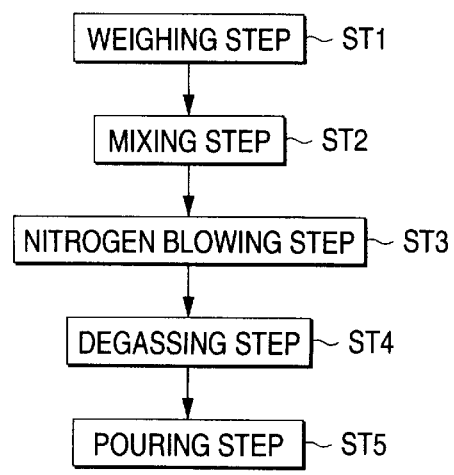
FIG. 4 is a flow chart of a particular process for preparing aqueous ink compositions.

FIG. 4 is a flow chart of the process steps according to the invention, which comprises steps 1 through 5. Step 1 is a weighing step in which the ink constituent materials are weighed out. Step 2 is a mixing step in which the weighed materials are mixed by stirring while cooling, i.e., at or below room temperature. Cooling suppresses the decomposition of urea and production of ammonium ions to some extent, but partial decomposition of urea to produce ammonium ions can not be avoided completely. For example, an ink composition having the above composition has a dissolved ammonium concentration of about 180 ppm when prepared at ambient temperature.

In step 3, nitrogen is blown through the mixture to release free ammonia (nitrogen blowing step). Part of the ammonium ions are converted to free ammonia at a pH of 7 or higher. Free ammonia is released in the atmosphere upon blowing nitrogen, i.e., supersaturation with nitrogen, to decrease the dissolved ammonium concentration by about 20 to 30%.

In step 4, the mixture from step 3 is exposed to reduced pressure to remove nitrogen (degassing step). The mixture is allowed to stand at room temperature in a reduced pressure atmosphere (for example 10 mmHg for about 20 seconds) to reduce the dissolved nitrogen content to 5 ppm or lower.

In step 5, the mixture from step 4 is poured into an ink container, which may be a tank, a bag or a cartridge.

The invention will be further described in the following examples, which do not limit the scope of the invention described in the claims.

EXAMPLES

In the following examples, the ink composition and/or preparation are illustrated as providing an aqueous ink composition which does not tend to become supersaturated with nitrogen.

Example 1
Preparation of Aqueous Ink Compositions

Aqueous ink compositions prepared by the process according to the invention are not particularly limited in compounding components and compounding ratios as long as they comprise urea, a colorant comprising an azo dye, and water and does not have an ammonium ion as a counter ion. A typical example of a useful ink composition is shown below. All the parts are given by weight.

| | |
|---|---|
| C.I. Direct Black 151 (azo dye) | 3.5 parts |
| Glycerol | 11 parts |
| 2-Pyrrolidone | 5 parts |
| Acetylene qlycol type surfactant | 3.2 parts |
| Urea | 1.8 parts |
| Water | 75.5 parts |

The aqueous ink thus prepared is protected from evaporation of water because of urea and therefore is not prone to nozzle clogging, such as that resulting from the coagulation of ink components. In addition, urea in the ink composition increases the solubility of glass components dissolved from borosilicate glass typically used as a material in ink paths. Therefore, the dissolved glass components do not tend to precipitate in the nozzles and clogging of the nozzles is thereby avoided.

In Example 1, the dissolved ammonium ion concentration of the prepared ink composition was reduced by blowing nitrogen to 200 ppm or lower irrespective of the compounding ratio of urea. The ink composition according to Example 1 had its dissolved nitrogen content and ammonium ion concentration established at much lower levels than 5 ppm and 200 ppm, respectively, in the initial stage of its service life. Even if urea in the ink decomposes to produce ammonium ions, thereby reducing the solubility of nitrogen, the amount of nitrogen produced from an azo dye in this case would not supersaturate the ink. That is, since the initially dissolved nitrogen content and the initial ammonium ion concentration have been decreased to considerably low levels, the ammonium ions, if produced upon urea decomposition during use of the ink, never exceeds about 800 ppm. Even though water partly evaporates from the ink, the nitrogen concentration of the ink can be adjusted to about 7 ppm or lower. With the nitrogen concentration so low, printing defects due to bubbles do not occur. According to Example 1, nitrogen does not reach supersaturation even in the presence of urea so that bubbles do not tend to form. Therefore, the aqueous ink composition obtained in Example 1, when used in an ink jet recording unit, maintains its high printing performance without frequent maintenance operations, such as priming, pumping, flushing, and the like.

Even when the above-described process of ink preparation is followed, various experiments have shown that a preferred compounding ratio of urea is not more than 2.4% by weight for controlling the ammonium ion concentration while securing sufficiently high water retention.

Example 2
Adjusting Amount of Added Urea

While in Example 1, the initial ammonium ion concentration of the aqueous ink composition is reduced to a suitably low level by the step of blowing nitrogen, in Example 2 the ammonium ion concentration is adjusted by controlling the amount of urea added. That is, the urea content of the aqueous ink composition, which comprises urea, a colorant comprising an azo dye, and water and which does not have an ammonium ion as a counter ion, is restricted within a range of from about 0.2 to about 2.4% by weight. A typical ink composition according to Example 1 was prepared.

Since the urea content is as low as about 0.2 to about 2.4% by weight, the ammonium ion concentration does not exceed 200 ppm so that the solubility of nitrogen can be kept high without the step of blowing nitrogen as conducted in Example 1.

Example 3
The Effects of Urea on Ink Composition Stability

Ink A having the following basic formulation (all the parts are by weight) was prepared at room temperature.

| | |
|---|---|
| C.I. Direct Black 151 (azo dye) | 3.5 parts |
| Glycerol | 11 parts |
| 2-Pyrrolidone | 5 parts |
| Acetylene qlycol type surfactant | 3.2 parts |
| Water | 75.5 parts |

The components of the ink composition according to Example 1 were mixed at room temperature, and the mixture was subjected to degassing to give prepared ink composition B having an initial dissolved ammonium ion concentration of 200 ppm or less and an initial dissolved nitrogen content of 5 ppm or less.

Ink C was prepared at 98° C. by adding 4.8 parts by weight of urea to the above basic formulation. An ink jet head was filled with each of ink A and ink C and allowed to stand at 60° C. for 5 days with its nozzles uncapped (open to air). Thereafter printing was carried out. Dot missing attributed to clogging of the nozzles was not observed with ink C containing urea whereas dot missing occurred with ink A containing no urea. Separately, an ink jet head was filled with ink C and allowed to stand at 60° C. for 9 days with its nozzles capped and then at 25° C. and 30% RH (relative humidity) for 14 days with its nozzles open to air. When printing was carried out thereafter, formation of bubbles in the ink was observed.

Ink composition B was charged in an ink jet head in the same manner as for ink composition A and ink composition C. After leaving the ink jet head uncapped at 60° C. for 5 days, printing was carried out. As a result, it was observed that no dots were missing from the print substrate due to clogging of the nozzles. Even after ink composition B charged in the ink jet head was allowed to stand at 60° C. for 9 days with the nozzles capped and then at 25° C. and 30% relative humidity for 14 days with the nozzles uncapped, printing was carried out normally without evidence of bubble formation in the ink.

Other Embodiments

It is to be understood that while the invention has been described in conjunction with the detailed description thereof, the foregoing description is intended to illustrate and not limit the scope of the appended claims. Other aspects, advantages, and modifications are within the scope of the following claims.

What is claimed is:

1. An aqueous ink composition comprising:

urea;

a colorant comprising an azo dye;

and water, wherein the composition has a dissolved ammonium ion concentration of 200 ppm or lower and a dissolved nitrogen content of 5 ppm or lower.

2. The aqueous ink composition according to claim 1, wherein said urea is present in a concentration of from about 0.2 to about 2.4% by weight.

3. An aqueous ink composition according to claim 1, wherein the aqueous ink has a pH of from about 7 to about 10.

4. A process for preparing an aqueous ink composition comprising the steps of:

blowing nitrogen through a composition comprising urea, a colorant comprising an azo dye, and water to release free ammonia from the composition;

degassing the resulting composition to release nitrogen; and filling an ink container with the resulting composition.

5. The process according to claim 4, wherein the step of blowing nitrogen is carried out until the dissolved ammonium ion concentration of the composition decreases to 200 ppm or lower.

6. The process according to claim 4, wherein the step of degassing is carried out until the dissolved nitrogen content of the composition decreases to 5 ppm or lower.

7. An aqueous ink composition prepared by the process according to claim 4.

8. A process for preparing an aqueous ink composition comprising the steps of:

preparing a mixture comprising 0.2% to 2.4% urea by weight, a colorant comprising an azo dye, and water;

degassing the mixture until dissolved nitrogen is present in the composition at less than 5 ppm; and filling an ink container with the resulting aqueous ink composition.

9. An ink jet recording apparatus comprising:

an ink jet head having an ink path for ejecting an aqueous ink composition onto a recording medium;

said aqueous ink composition comprising:

urea;

a colorant comprising an azo dye;

and water, wherein the composition has a dissolved ammonium ion concentration of 200 ppm or lower and a dissolved nitrogen content of 5 ppm or lower.

10. The ink jet recording apparatus according to claim 9, wherein part of the ink path of the ink jet head is made of borosilicate glass.

* * * * *